(12) United States Patent
McDonald et al.

(10) Patent No.: US 7,629,397 B2
(45) Date of Patent: Dec. 8, 2009

(54) PHASE SEPARATION PROCESS UTILIZING A HYDROFLUOROCARBON

(75) Inventors: Michael F. McDonald, Kingwood, TX (US); Scott T. Milner, Somerville, NJ (US); D. Shaffer Timothy, Hackettstown, NJ (US); N. Webb Robert, Kingwood, TX (US); D. Hembree Richard, Zachary, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 374 days.

(21) Appl. No.: 11/474,214

(22) Filed: Jun. 23, 2006

(65) Prior Publication Data

US 2007/0299161 A1 Dec. 27, 2007

(51) Int. Cl.
C08F 6/00 (2006.01)
C08F 85/00 (2006.01)
C08F 14/18 (2006.01)
C08K 5/01 (2006.01)
C02F 9/00 (2006.01)

(52) U.S. Cl. .............. 523/332; 210/262; 210/263; 526/68; 526/250; 526/170; 524/474; 524/543; 524/571; 585/802; 585/833; 585/836

(58) Field of Classification Search .............. 210/634, 210/262, 263; 585/802, 833, 836–840; 524/490, 524/474, 543, 571; 570/262–263; 526/68, 526/250, 170
See application file for complete search history.

(56) References Cited

U.S. PATENT DOCUMENTS

| | | | |
|---|---|---|---|
| 2,534,698 A | 12/1950 | Calfee et al. | |
| 2,542,559 A | 2/1951 | Nelson et al. | |
| 2,548,415 A | 4/1951 | Welch et al. | |
| 2,644,809 A | 7/1953 | Saylor, Jr. | |
| 2,940,960 A | 6/1960 | Tegge et al. | |
| 3,470,143 A | 9/1969 | Schrage et al. | |
| 3,496,135 A | 2/1970 | Caywood, Jr. | |
| 3,553,156 A | 1/1971 | Anolick et al. | |
| 3,726,843 A | 4/1973 | Anolick et al. | |
| 4,319,021 A | 3/1982 | Irani et al. | |
| 4,623,712 A | 11/1986 | Irani et al. | |
| 4,857,633 A | 8/1989 | Irani et al. | |
| 4,946,940 A * | 8/1990 | Guckes et al. | 528/483 |
| 5,264,536 A | 11/1993 | Radosz | |
| 5,417,930 A | 5/1995 | McDonald, Jr. et al. | |
| 5,527,870 A * | 6/1996 | Maeda et al. | 526/348.7 |
| 5,624,878 A | 4/1997 | Devore et al. | |
| 5,861,473 A * | 1/1999 | DeCrosta et al. | 528/490 |
| 7,026,051 B2 * | 4/2006 | Schauer et al. | 428/403 |
| 2004/0119196 A1 | 6/2004 | Hyunkook | |
| 2006/0100398 A1* | 5/2006 | Shaffer et al. | 526/64 |
| 2007/0299190 A1* | 12/2007 | McDonald et al. | 524/474 |

FOREIGN PATENT DOCUMENTS

| | | |
|---|---|---|
| DE | 10061727 | 6/2000 |
| EP | 014 934 2 | 7/1985 |
| EP | 1 343 829 | 9/2003 |
| RU | 2 209 213 | 7/2003 |
| WO | WO 00/04061 | 1/2000 |
| WO | WO 02/34794 | 5/2002 |
| WO | WO 02/096964 | 12/2002 |
| WO | WO 2004/058828 | 7/2004 |
| WO | WO 2004058828 A1 * | 7/2004 |
| WO | WO 2006/009550 | 1/2006 |
| WO | WO 2006/009951 | 1/2006 |

OTHER PUBLICATIONS

Kennedy, Joseph, "*Cationic Polymerization of Olefins, A Critical Inventory*," Wiley Interscience, 1975.
Matyjaszewski, K., "*Cationic Polymerizations*," Marcel Dekker, Inc., 1996.
"*Chemical and Engineering News*," vol. 63, pp. 27, 1985.
Thaler et al., "*High Molecular-Weight, High Unsaturation Copolymers of Isobutylene and Conjugated Dienes*," Rubber Chemical Technology, vol. 49, pp. 960, 1976.
Bardin et al., "*Lower Critical Solution Tempertures of Polyisobutylene Plus Isomeric Alkanes*," D. Polymer, vol. 10, pp. 247, 1969.
Morrison and Boyd, "*Marcomolecules, Polymers and Polymerization*," Organic Chemistry, Chapter 31, pp. 1084-1085, 1992.
U.S. Appl. No. 11/473,732, filed Jun. 23, 2006, McDonald, et al.

* cited by examiner

*Primary Examiner*—Mark Eashoo
*Assistant Examiner*—Jae Kwak
(74) *Attorney, Agent, or Firm*—Xiaobing Feng; Nancy T. Krawczyk

(57) ABSTRACT

Provided for herein is a process for separating a hydrocarbon-rubber from a hydrofluorocarbon diluent comprising contacting a polymer slurry comprising the hydrocarbon-rubber dispersed within the hydrofluorocarbon diluent with a hydrocarbon solvent capable of dissolving the hydrocarbon-rubber, to produce a first liquid phase and a second liquid phase, and separating the first liquid phase from the second liquid phase.

57 Claims, 2 Drawing Sheets

PHASE SEPARATION PROCESS UTILIZING A HYDROFLUOROCARBON

FIELD OF INVENTION

This disclosure relates to a hydrocarbon-rubber composition, and methods for separating diluent and unreacted monomers from a solution comprising a hydrocarbon-rubber dissolved in a hydrocarbon solvent. In particular, this disclosure relates to the use of a hydrofluorocarbon diluent as a phase separating agent to separate monomers such as $C_4$-$C_7$ isoolefins from mixtures such as butyl rubber dissolved in a $C_5$-$C_{10}$ hydrocarbon solvent. This disclosure also relates to methods for preparing a rubber cement from a solution comprising a hydrocarbon-rubber dissolved in a hydrocarbon solvent and a diluent by addition of a hydrofluorocarbon phase separating agent to produce a polymer rich rubber cement phase and a diluent rich phase.

BACKGROUND

Isoolefin polymers, and in particular, hydrocarbon-rubbers, may be prepared in carbocationic polymerization processes. See, e.g., *Organic Chemistry*, SIXTH EDITION, Morrison and Boyd, Prentice-Hall, 1084-1085, Englewood Cliffs, New Jersey 1992, and K. Matyjaszewski, ed, *Cationic Polymerizations*, Marcel Dekker, Inc., New York, 1996. The catalyst system for producing hydrocarbon-rubbers typically includes two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, the isoolefin, e.g., isobutylene, reacts with the Lewis acid/initiator pair to produce a carbenium ion. Following the initiation step, additional monomer units add to the formed carbenium ion in what is generally referred to as the propagation step. These steps typically take place in a diluent or in a solvent.

Industry has generally accepted widespread use of a slurry polymerization process to produce hydrocarbon-rubbers, using methyl chloride (MeCl) as the diluent. Typically, the diluent used in slurry polymerization processes consists essentially of methyl chloride. Methyl chloride is employed for a variety of reasons, including the ability of methyl chloride to dissolve the monomers and the aluminum chloride catalyst of the reaction mixture, but not dissolve the hydrocarbon-rubber polymer product of the polymerization process. Methyl chloride also has a suitable freezing point to permit low temperature polymerization, typically at temperatures less than or equal to −90° C. Methyl chloride also has a suitably low boiling point to allow for effective separation of the hydrocarbon-rubber polymer from the diluent. A slurry polymerization process using methyl chloride as the diluent also offers the advantage of a hydrocarbon-rubber polymer concentration of approximately 26% to 37% by volume in the reaction mixture, as opposed to a concentration of only about 8% to 12% in a solution polymerization process, wherein the hydrocarbon-rubber polymer is at least partially dissolved in a solvent. Reaction mixtures using methyl chloride as a diluent also have a relatively low viscosity, enabling the heat of polymerization formed during the polymerization reaction to be removed effectively by surface heat exchange.

Typical commercial reactors used to produce hydrocarbon-rubber in a slurry polymerization process include well mixed vessels with a volume of about 10 to 30 liters, wherein the circulation of the reaction mixture is often provided by a pump impeller. An example of such a reactor includes a continuous flow stirred tank reactor ("CFSTR") as described in U.S. Pat. No. 5,417,930, which is incorporated by reference herein. For purposes herein, a reactor suitable for use in a slurry polymerization process to produce rubber is referred to in general as a "reactor" or as a "butyl reactor". In these reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, inhibiting heat transfer, which would tend to cause the slurry temperature to rise. This often limits the practical slurry concentration that can be used in most reactors from 26 to 37 volume % relative to the total volume of the slurry, diluent, and unreacted monomers. The subject of polymer accumulation has been addressed in several patents (such as U.S. Pat. No. 2,534,698, U.S. Pat. No. 2,548,415, and U.S. Pat. No. 2,644,809). However, these patents have unsatisfactorily addressed the myriad of problems associated with polymer particle agglomeration for implementing a desired commercial process. Additionally, Thaler, W. A., Buckley, Sr., D. J., *High Molecular-Weight, High Unsaturation Copolymers of Isobutylene and Conjugated Dienes*, 49(4) Rubber Chemical Technology, 960 (1976), discloses, inter alia, the cationic slurry polymerization of copolymers of isobutylene with isoprene (butyl rubber) and with cyclopentadiene in heptane.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

Other polymerization processes and/or downstream processing of polymers are carried out in a vehicle which is a solvent for both the monomers to be polymerized and the polymer formed. In such "solvent polymerization processes", the separation of the polymer from the vehicle is generally an energy intensive step where the separation of the polymer from the solvent is carried out by steam stripping or other suitable solvent evaporation techniques. This is an energy intensive process. It has long been recognized that substantial economies in polymer processes could be achieved if the energy requirements of the solvent-polymer separation step could be minimized.

It is well known that many solvent-polymer solutions are stable over a limited temperature range and can be caused to separate into a solvent rich and polymer rich phase by heating or cooling. Upon heating, these solutions exhibit a lower critical solution temperature (LCST) above which separation of the polymer from the solvent system will occur. This separation results in the formation of two distinct phases, one a solvent rich phase, the other a polymer rich phase. These phase separation phenomena are generally pressure dependent, and the two phase systems can be made to revert to a homogeneous single phase by isothermally increasing the pressure of the system above a critical value which depends upon the composition of the solution and the molecular weight of the polymer. The LCST for polyisobutylene (PIB)

was disclosed in Bardin, J.-M.; Patterson, D. Polymer 1969, 10, 247, the entirety of which is hereby incorporated by reference.

The LCST is that temperature above which a solution will separate into two distinct phases, a solvent rich phase and a solute rich phase. The separation phenomenon can also occur at a second lower temperature termed the Upper Critical Solution Temperature (UCST). Below the UCST a two phase separation again occurs. The measurement of LCST and UCST end points are made at the vapor pressure of the solution. The prior art teaches a number of methods of utilizing the LCST as a means for causing a polymer solution to separate into a polymer rich phase and a solvent rich phase. Illustrative prior art processes which have utilized the LCST phenomenon in polymer separation processes include those described in U.S. Pat. Nos. 3,553,156; 3,496,135; and 3,726,843. These prior art processes are disadvantageous in that a significant amount of heat energy is required to raise the temperature of the solution to affect the desired separation.

U.S. Pat. No. 4,319,021 is directed to an improvement in the foregoing phase separation processes which permits the use of lower separation temperatures. The technique described in this patent includes the addition of a low molecular weight hydrocarbon to the polymer solution. Suitable low molecular weight hydrocarbons are the $C_2$-$C_4$ alkenes and alkanes, which are utilized at about 2 to about 20 weight percent (wt %). While this improved process substantially reduces the phase separation temperature, heating is still required in order to affect the desired separation. Separation processes utilizing the UCST are also disadvantageous because of the need to further cool the solutions.

U.S. Pat. No. 4,946,940 is directed to a phase separation process wherein a temperature independent phase separation is reportedly caused to occur in a polymer solution by introducing into the polymer solution a critical amount of a phase separation agent. Below the critical concentration of the phase separation agent, the mixture exhibits a normal, lower critical solution temperature ("LCST"). Compounds useful as phase separation agents in the practice of this disclosure include $CO_2$, $C_1$-$C_4$ alkanes, $C_2$-$C_4$ alkenes, $C_2$-$C_4$ alkynes, hydrogen, nitrogen and its various oxides, helium, neon, CO and mixtures thereof.

In such methods, a sufficient amount of a phase separation agent (PSA) is introduced into the polymer solution so that the solution, under appropriate pressures, can separate out a polymer rich phase at all temperatures between the LCST and the UCST (as determined using the pure polymer-solvent system, essentially free of the PSA.) The consequent phase separation results in a polymer rich phase and a solvent rich phase. Where methane is used as the PSA, under appropriate conditions for hydrocarbon polymers, the solvent rich phase comprises about 80% or more by volume of the total system and is substantially free of polymer.

There is need for a process technique which would allow for the economies of the afore described slurry preparation process along with the ease of separation and economies associated with phase separation of a solvent polymerization process to be carried out at or near the polymerization reaction exit temperature. In that way, little or no additional heat input would be required to affect the separation. Heretofore, such idealized, improved processes have not been achieved.

Other background references include U.S. Pat. Nos. 2,542,559; 2,940,960; 3,553,156; 3,470,143; 3,496,135; 3,726,843; 4,623,712; 4,857,633; 5,264,536; 5,624,878; and 5,527,870; U.S. patent application US2004/0119196A1; RU 2 209 213; DE 100 61 727 A; EP 014 934 2 A2; WO 02/096964; WO 02/34794; and WO 00/04061.

SUMMARY OF THIS DISCLOSURE

In some embodiments, the present disclosure relates to a process for separating a hydrocarbon-rubber from a polymer slurry having the hydrocarbon-rubber dispersed within a diluent, which comprises the steps of:
(a) contacting the polymer slurry with a hydrocarbon solvent capable of dissolving the hydrocarbon-rubber, to produce a first liquid phase and a second liquid phase; and
(b) separating the first liquid phase from the second liquid phase, wherein the diluent comprises a hydrofluorocarbon, the first liquid phase comprises at least 60 wt % of the hydrofluorocarbon based on the total weight of the hydrofluorocarbon in the polymer slurry, and the second liquid phase comprises at least 90 wt % of the hydrocarbon-rubber based on the total weight of the hydrocarbon-rubber in the polymer slurry.

In additional embodiments, the present disclosure relates to a process for separating a hydrocarbon-rubber from a polymer slurry having the hydrocarbon-rubber dispersed within a diluent, which comprises the steps of:
(a) contacting the polymer slurry with a hydrocarbon solvent capable of dissolving the hydrocarbon-rubber, to produce a first essentially homogeneous liquid phase and a second essentially homogeneous liquid phase; and
(b) separating the first liquid phase from the second liquid phase, wherein the diluent comprises a hydrofluorocarbon, the first liquid phase comprises at least 60 wt % of the hydrofluorocarbon based on the total weight of the hydrofluorocarbon in the polymer slurry, and the second liquid phase comprises at least 90 wt % of the hydrocarbon-rubber based on the total weight of the hydrocarbon-rubber in the polymer slurry.

In some aspects of this disclosure, the first liquid phase, the second liquid phase, the first essentially homogeneous liquid phase, and the second essentially homogeneous liquid phase contain less solid than the polymer slurry based on the weight percentage of solid in the liquid phase(s) or the polymer slurry.

In further additional embodiments, the present disclosure relates to a process for separating a hydrocarbon-rubber from a polymer slurry having the hydrocarbon-rubber dispersed in a hydrofluorocarbon diluent of, comprising the steps of
a) contacting the polymer slurry with a hydrocarbon solvent to dissolve the hydrocarbon-rubber at a pressure greater than or equal to the vapor pressure of the resulting mixture;
b) adjusting the temperature, the pressure, and/or the weight fraction of the diluent in the resulting mixture to introduce phase-separation of the resulting mixture to produce a first essentially homogeneous liquid phase and a second essentially homogeneous liquid phase; and
c) separating the first liquid phase from the second liquid phase by decanting, gravity settling, liquid/liquid centrifugation, or a combination thereof, wherein the first liquid phase comprises at least 60 wt % of the hydrofluorocarbon diluent based on the total weight of the hydrofluorocarbon diluent in the polymer slurry and wherein the second liquid phase comprises at least 90 wt % of the hydrocarbon-rubber based on the total weight of the hydrocarbon-rubber in the polymer slurry.

In further embodiments, the present disclosure relates to a process for retrofitting an existing slurry cationic polymerization plant, the retrofitting process comprising the steps of:
a) contacting a polymer slurry from the slurry cationic polymerization plant, the polymer slurry comprises a hydrocarbon-rubber dispersed in a diluent, with a hydrocarbon solvent to dissolve the hydrocarbon-rubber at a pressure greater than or equal to the vapor pressure of the resulting mixture, the diluent comprises a hydrofluorocarbon;

b) adjusting the temperature, the pressure, and/or the weight fraction of the hydrofluorocarbon in the resulting mixture to introduce phase-separation of the resulting mixture to produce a first essentially homogeneous liquid phase and a second essentially homogeneous liquid phase; and c) separating the first liquid phase from the second liquid phase by decanting, gravity settling, liquid/liquid centrifugation, or a combination thereof, wherein the first liquid phase comprises at least 60 wt % of the hydrofluorocarbon diluent based on the total weight of the hydrofluorocarbon diluent in the polymer slurry and wherein the second liquid phase comprises at least 90 wt % of the hydrocarbon-rubber based on the total weight of the hydrocarbon-rubber in the polymer slurry.

In yet additional embodiments, the present disclosure relates to a process for retrofitting an existing solution cationic polymerization plant, the retrofitting process comprising the steps of:

a) contacting a polymer solution from the solution cationic polymerization plant, the polymer solution comprises a hydrocarbon-rubber dissolved in a solvent, with a hydrofluorocarbon at a pressure greater than or equal to the vapor pressure of the resulting mixture;

b) adjusting the temperature, the pressure, and/or the weight fraction of the hydrofluorocarbon in the resulting mixture to introduce phase-separation of the resulting mixture to produce a first essentially homogeneous liquid phase and a second essentially homogeneous liquid phase; and c) separating the first liquid phase from the second liquid phase by decanting, gravity settling, liquid/liquid centrifugation, or a combination thereof, wherein the first liquid phase comprises at least 60 wt % of the hydrofluorocarbon based on the total weight of the hydrofluorocarbon in the polymer slurry and wherein the second liquid phase comprises at least 90 wt % of the hydrocarbon-rubber based on the total weight of the hydrocarbon-rubber in the polymer slurry.

In some aspects of this disclosure, process(es) of this disclosure, wherein the hydrocarbon solvent comprises $C_1$-$C_{10}$ hydrocarbons, preferably linear, branched, or cyclic $C_5$-$C_8$ hydrocarbons. In a preferred embodiment, the hydrocarbon solvent is selected from the group consisting of: propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcypopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof. In a more preferred embodiment, the hydrocarbon solvent comprises an ultra low benzene grade hexane, the ultra low benzene grade hexane consists essentially of a mixture of n-hexane, 2-methylpentane, 3-methylpentane, methylcyclopentane, and cyclohexane.

In some aspects of this disclosure, the hydrofluorocarbon comprises at least one carbon atom, at least one hydrogen atom, and at least one fluorine atom. Preferably, the hydrofluorocarbon comprises at least one carbon atom, and at least two fluorine atoms. More preferably the hydrofluorocarbon comprises 1,1-difluoroethane and/or 1,1,1,2-tetrafluoroethane.

Additionally, the hydrofluorocarbon is represented by the formula:

$C_xH_yF_z$ wherein x is an integer from 1 to 10, y is greater than or equal to 1, and z is greater than or equal to 1. In a preferred embodiment, the hydrofluorocarbon is selected from the group consisting of: fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Preferably, the hydrofluorocarbon is a gas at 25° C. and a pressure of 101.3 kPa-a. The hydrofluorocarbon is at least 20 wt % of the total combined mass of the polymer slurry and the hydrocarbon solvent. The diluent further comprises methyl chloride. The hydrofluorocarbon is selected such that more of the hydrocarbon solvent is required to produce the first liquid phase and the second liquid phase, as compared to using methyl chloride as a diluent under the same conditions.

In some aspects of this disclosure, the polymer slurry additionally comprises unreacted monomer(s), catalyst, or a combination thereof. The first liquid phase comprises essentially all of the unreacted monomer(s), catalyst, or a combination thereof, originally present in the polymer slurry. The polymer slurry further comprises a Lewis acid, wherein the Lewis acid comprises a metal or metalloids from Group 4, 5, 13, 14 or 15 of the Periodic Table of Elements.

Depending on the pressure and temperature of the process, a third vapor phase may also be present, the third vapor phase comprising or consisting essentially of the hydrofluorocarbon diluent.

In one aspect, the hydrocarbon-rubber comprises polymer(s) and/or co-polymer(s) of isobutylene, isoprene, para-methyl styrene, or a combination thereof. The hydrocarbon-rubber slurry comprises greater than or equal to about 10 vol % solids. The hydrocarbon-rubber slurry is at a temperature of less than or equal to about −20° C. when contacted with the hydrocarbon solvent.

Additionally, the first liquid phase comprises less than 5 wt % of the hydrocarbon-rubber based on the total weight of the hydrocarbon-rubber in the polymer slurry. The second liquid phase comprises greater than 95 wt % of the hydrocarbon-rubber based on the total weight of the hydrocarbon-rubber in the polymer slurry.

In some embodiments, the temperature of the adjusting step of this disclosure ranges from about −100 to about 160° C.

In additional embodiments of the present disclosure relates to a hydrocarbon-rubber composition made by a method comprising at least one process of this disclosure.

DETAILED DESCRIPTION

Figure 1:
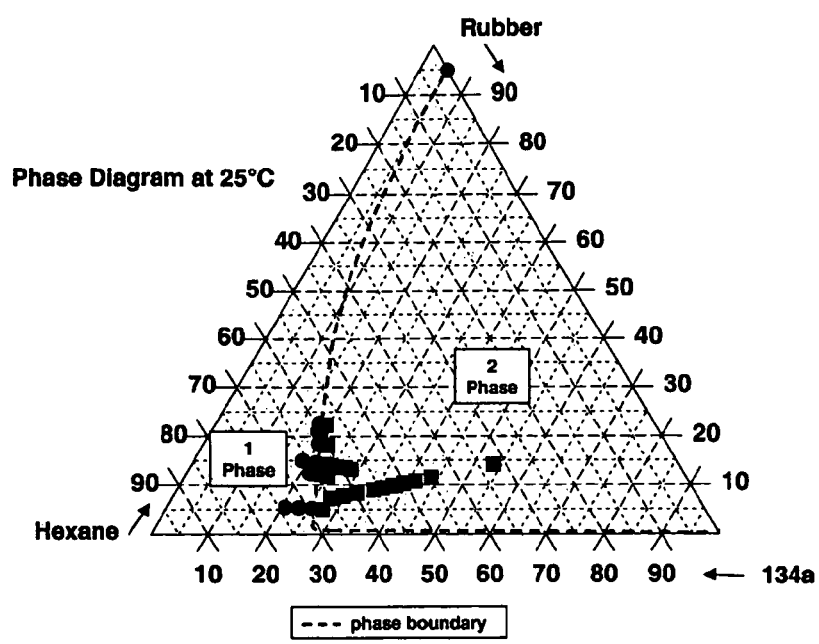
FIG. 1 shows a phase diagram of the three component system of butyl rubber, hexane and 1,1,1,2-tetrafluroethane (134a) at 25° C.

Various specific embodiments, versions and examples of the present disclosure will now be described, including preferred embodiments and definitions that are adopted herein for purposes of understanding the claimed invention. For determining infringement, the scope of the "invention" will refer to any one or more of the appended claims, including equivalents thereof, and elements or limitations that are equivalent to those recited.

For purposes of this disclosure and the claims thereto, the terms "hydrocarbon-rubber polymer", "hydrocarbon-rubber composition", "hydrocarbon-rubber", and "rubber" are used interchangeably herein, and refer to elastomers or elastomeric compositions of polymers consistent with the ASTM D1566-06 definition. Examples of hydrocarbon-rubber comprise polymer(s) and/or co-polymer(s) of isobutylene, isoprene, para-methyl styrene, or a combination thereof. In preferred embodiments, hydrocarbon-rubber polymers include polyisobutylene homopolymers, isobutylene-isoprene (butyl rubber) copolymers, isobutylene and para-methylstyrene copolymers, star-branched butyl rubber terpolymers, and the like. Further examples of hydrocarbon-rubber comprise halogenated polymer(s) and/or halogenated co-polymer(s) of isobutylene, isoprene, para-methyl styrene, or a combination thereof.

The term "catalyst system" refers to and includes any Lewis acid(s) or other metal complex(es) used to catalyze the polymerization of the olefinic monomers to produce hydrocarbon-rubber polymers, as well as at least one initiator, and optionally other catalyst component(s).

The phrase "suitable polymerization conditions" relates to the selection of polymerization conditions and components, well within the ability of those skilled in the art, which are necessary to obtain the production of a desired polymer in light of process parameters and component properties. There are numerous permutations of the slurry polymerization process to produce hydrocarbon-rubber polymers, as well as numerous variations in the polymerization components available to produce a hydrocarbon-rubber having one or more desired attributes.

The phrase "polymer slurry" refers to a reactor effluent comprising any gas, vapor, liquid, or combination thereof of the slurry after polymerization. The polymer slurry includes the hydrofluorocarbon diluent or mixture of diluents, solvents, the unreacted monomers, as well as other components in the feed or catalyst systems, and the hydrocarbon rubber polymer. Of course, the catalyst system or catalyst system components are present only to the extent they are present after polymerization. The polymer slurry may also refer to a hydrocarbon rubber polymer dispersed within a hydrofluorocarbon diluent, whether or not the polymer slurry is a direct reaction product.

The phrases "rubber cement" and "hydrocarbon-rubber cement" are used interchangeable herein, refers to mixture(s) made from rubber mixed in a solvent such as hexane, heptane or benzene. The mixture(s) further comprises diluent(s), catalyst, and/or unreacted monomer(s).

Diluent means a diluting or dissolving agent. Hydrofluorocarbon diluent is specifically defined to include particular hydrofluorocarbons that can act as solvents for the Lewis Acid, other metal complexes, initiators, monomers or other additives in a process to produce hydrocarbon-rubber, but in which the hydrocarbon-rubber produced is not readily soluble. In the practice of this disclosure, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc. to any appreciable extent. Additionally, and unless otherwise specified, the term diluent may include mixtures of at least two or more diluents.

The term "retrofit" as used herein means to provide (a process, a manufacture, a plant, or a factory, for example) with parts, devices, or equipment not in existence or available at the time of original manufacture and/or to install or fit (a process, a facility, or a reactor, for example) for use in or on an existing structure of an existing solution cationic polymerization plant or an existing slurry cationic polymerization plant.

Various other terms used herein include a reactor, which is defined as any container(s) in which a chemical reaction occurs. As used herein, the new numbering scheme for the Periodic Table Groups are used as in CHEMICAL AND ENGINEERING NEWS, 63(5), 27 (1985). Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

Alkyl refers to a paraffinic hydrocarbon group having from 2 to 20 carbon atoms, which may be derived from the corresponding alkane by dropping one or more hydrogens from the formula, such as, for example, a methyl group ($CH_3$) which is derived from methane ($CH_4$), or an ethyl group ($CH_3CH_2$) which is derived from ethane ($CH_3CH_3$), and the like.

Aryl refers to a hydrocarbon group comprising 5 to 20 carbon atoms, that forms a conjugated ring structure characteristic of aromatic compounds such as, for example, benzene, naphthalene, phenanthrene, anthracene, and the like, which possess alternating double bonding ("unsaturation") within its structure. An aryl group is thus a group derived from an aromatic compound by dropping one or more hydrogens from the formula such as, for example, phenyl, or $C_6H_5$.

The term "substituted functional group(s)" refers to replacement of at least one hydrogen atom on the functional group (e.g., alkyl, alkene, alkyne, aryl) by at least one substituent selected from, for example, halogen (chlorine, bromine, fluorine, or iodine), amino, nitro, sulfoxy (sulfonate or alkyl sulfonate), thiol, alkylthiol, and hydroxyl; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen.

The term "essentially homogeneous liquid phase" refers to a liquid phase wherein at least 99 wt % of the material is in a single liquid phase Accordingly, an essentially homogeneous liquid phase need not comprise a single phase, but may include less than 1 wt % of solids including various components, which are not fully dissolved in the liquid phase.

Monomers and Polymers

Monomers useful in the present disclosure include any hydrocarbon monomer that may be cationically polymerized using a Lewis acid dispersed in a diluent. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group. For a detailed discussion of cationic catalysis please see *Cationic Polymerization of Olefins, A Critical Inventory*, Joseph Kennedy, Wiley Interscience, New York 1975.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

The process of this disclosure may be applied to the separation of a broad range of polymers. Illustrative of solution polymerization processes to which the separation process of this disclosure may be applied are processes for preparing butyl rubber, polyisoprene, polychloroprene, polybutadiene, polybutene, ethylene-propylene rubber (EPM), ethylene propylene-nonconjugated dienes which may be utilized in preparing EPDM include methylene norbornene, ethylidene norbornene, 1-4 hexadiene, dicyclopentadiene, and the like. Other preferred polymers include copolymers of 1) isobutylene and an alkylstyrene; and 2) isobutylene and isoprene. The process of this disclosure is preferably applied to the separation of isoolefin polymers and copolymers.

In one embodiment butyl polymers are prepared by reacting a comonomer mixture, the mixture having at least (1) a $C_4$ to $C_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, 13-pinene, myrcene, 6,6-dimethyl-fulvene, hexadiene, cyclopentadiene and piperylene. One embodiment of the butyl rubber polymer of this disclosure is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment. Table 1 illustrates how the above-referenced wt % would be expressed as mol %.

TABLE 1

| wt % Conversion to mol % | | | |
|---|---|---|---|
| wt % IC4[a] | mol % IC4 | wt % IC5[b] | Mol % IC5 |
| 70 | 73.9 | .5 | .4 |
| 85 | 87.3 | 5 | 4.2 |
| 92 | 93.3 | 8 | 6.7 |
| 95 | 95.9 | 15 | 12.7 |
| 99.5 | 99.6 | 30 | 26.1 |

[a]IC4 - isobutylene
[b]IC5 - isoprene

This disclosure further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably paramethyl styrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Lewis Acid

The Lewis acid (also referred to as the co-initiator or catalyst) may be any Lewis acid based on metals or metalloids from Groups 4, 5, 13, 14 or 15 of the Periodic Table of the Elements, including boron, aluminum, gallium, indium, titanium, zirconium, tin, vanadium, arsenic, antimony, and bismuth. One skilled in the art will recognize that some elements are better suited in the practice of this disclosure. In one embodiment, the metals are aluminum, boron and titanium, with aluminum being desirable. Illustrative examples include $AlCl_3$, $(alkyl)AlCl_2$, $(C_2H_5)AlCl_2$, $(C_2H_5)_2AlCl$ and $(C_2H_5)_3Al_2Cl_3$, $BF_3$, $SnCl_4$, $TiCl_4$.

Additionally, Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of this disclosure.

As one skilled in the art will recognize the aforementioned listing of Lewis acids is not exhaustive and is provided for illustration. For a more information regarding Lewis acids in polymerization processes, see, for example, International Application Nos. PCT/US03/40903 and PCT/US03/40340.

Initiator

Initiators useful in this disclosure are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), and alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalyst systems, such as when activated with weakly coordinating Lewis acids or Lewis acid salts have been used to initiate isobutylene polymerization.

In an embodiment, the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide.

As one skilled in the art will recognize the aforementioned listing of initiator(s) is not exhaustive and is provided for illustration. For more information regarding initiator(s) in polymerization processes, see, for example, International Application Nos. PCT/US03/40903 and PCT/US03/40340.

Polymerization Process

The hydrocarbon-rubber slurry utilized in the present disclosure may be produced in continuous and/or a batch processes. Further the process may be practiced in a plug flow reactor and/or stirred tank reactors. In particular the hydrocarbon-rubber slurry utilized in this disclosure may be produced in "butyl reactors." Illustrative examples include any reactor selected from the group consisting of a continuous flow stirred tank reactor, a plug flow reactor, a moving belt or drum reactor, a jet or nozzle reactor, a tubular reactor, and an autorefrigerated boiling-pool reactor.

In preferred embodiments, the hydrocarbon-rubber slurry is produced using a slurry polymerization process. The polymerization processes of this disclosure are preferably a cationic polymerization process. The polymerization process of this disclosure may be a continuous polymerization process. The polymerization processes of this disclosure may be a polymerization processes for the production of $C_4$-$C_7$ isoolefin polymers such as isobutylene based polymers.

The reacted monomers within the reactor form part of a slurry. In one embodiment, the concentration of the solids in the slurry is equal to or greater than 10 vol %. In another embodiment, the concentration of solids in the slurry is present in the reactor equal to or greater than 25 vol %. In yet another embodiment, the concentration of solids in the slurry is less than or equal to 75 vol %. In yet another embodiment, the concentration of solids in slurry is present in the reactor from 1 to 70 vol %. In yet another embodiment, the concentration of solids in slurry is present in the reactor from 5 to 70 vol %. In yet another embodiment, the concentration of solids in slurry concentration is present in the reactor from 10 to 70 vol %. In yet another embodiment, the concentration of solids in slurry concentration is present in the reactor from 15 to 70 vol %. In yet another embodiment, the concentration of solids in slurry concentration is present in the reactor from 20 to 70 vol %. In yet another embodiment, the concentration of solids in slurry concentration is present in the reactor from 25 to 70 vol %. In yet another embodiment, the concentration of solids in slurry concentration is present in the reactor from 30 to 70 vol %. In yet another embodiment, the concentration of solids in slurry concentration is present in the reactor from 40 to 70 vol %.

The temperature at which the hydrocarbon-rubber slurry is produced may be less than −20° C., preferably less than −40° C., with less than −50° C. being more preferred.

The order of contacting the monomer feed-stream, catalyst, initiator, and diluent may vary from one embodiment to another. For a more information regarding polymerization processes, see, for example, International Application Nos. PCT/US03/40903 and PCT/US03/40340.

Selection of the Hydrofluorocarbon Diluent

Hydrofluorocarbons are preferably used as diluents in the present disclosure, alone or in combination with other hydrofluorocarbons or in combination with other solvents, diluents, and the like. For purposes of this disclosure and the claims thereto, hydrofluorocarbons ("HFC's" or "HFC") are defined to be saturated or unsaturated compounds consisting essentially of hydrogen, carbon and fluorine, provided the HFC comprises at least one carbon atom, at least one hydrogen atom and at least one fluorine atom.

The method of the instant invention relies on the discovery that the amount of the HFC diluent that leads to liquid-liquid phase separation of a solution comprised of a hydrocarbon-rubber, a hydrocarbon solvent and an HFC diluent is significantly less than that required for chlorinated hydrocarbon diluents such as methyl chloride. Suitable HFC diluents of the present disclosure may be characterized as phase separating agents when put in contact with a solution of a hydrocarbon rubber dissolved in a hydrocarbon solvent. In addition, the catalyst and monomers utilized in formation of the hydrocarbon-rubber polymer are preferably soluble in the HFC diluent, while the hydrocarbon-rubber is preferably essentially insoluble in the HFC diluent.

Preferably the HFC diluent is a gas at 25° C. and 101.3 kPa-a of pressure. Below a particular pressure, unique to each diluent-polymer-solvent system, the system can be caused to separate into distinct phases. Isothermal increases in pressure reverse the phenomenon and result in a homogeneous system.

The HFC diluent of the present disclosure is thus selected such that upon contact of the hydrocarbon-rubber slurry with the hydrocarbon solvent, separation of the phases occurs over a temperature range that encompasses the UCST and LCST, as determined for a solvent-polymer system, free of monomers, the HFC diluent, and other extraneous compounds.

In certain embodiments, the diluent comprises hydrofluorocarbons represented by the formula: $C_xH_yF_z$ wherein x is an integer from 1 to 10, alternatively from 1 to 9, alternatively from 1 to 8, alternatively from 1 to 7, alternatively from 1 to 6, alternatively from 1 to 5, alternatively from 1 to 4, alternatively from 1 to 3, most preferably 2 carbon atoms, wherein y is at least 1 and z is at least 1.

Illustrative examples include fluoromethane; difluoromethane; trifluoromethane; fluoroethane; 1,1-difluoroethane; 1,2-difluoroethane; 1,1,1-trifluoroethane; 1,1,2-trifluoroethane; 1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC diluents include 1,1,1-trifluoroethane, 1,1-difluoroethane and 1,1,1,2-tetrafluoroethane, with 1,1,1,2-tetrafluoroethane being particularly preferred.

Illustrative examples of unsaturated hydrofluorocarbons include 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

The diluent may also comprise a blend comprising one or more of the above HFC diluents in combination with one or more substituted or unsubstituted alkanes, alkenes, alkynes, or a combination thereof, each comprising from 1 to 10 carbon atoms, preferably 1 to 5 carbon atoms, with 1 to 3 carbon atoms being most preferred.

In an embodiment, the diluent may comprise a blend with methyl chloride wherein such blend comprises 5 to 90 weight percent of methyl chloride based on the combined weight of the methyl chloride and the HFC present in the mixture, alternatively between 5 and 80 weight %, alternatively between 5 and 70 weight %, alternatively between 5 and 60 weight %, alternatively between 5 and 50 weight percent, alternatively between 5 and 40 weight percent, alternatively between 5 and 30 weight percent, alternatively between 5 and 20 weight % and alternatively between 5 and 10 weight %.

In another embodiment, the polymer slurry of the present disclosure is preferably essentially free of methyl chloride, wherein essentially free is defined as wherein methyl chloride is not intentionally added to the polymer slurry, however, methyl chloride may exist as a trace impurity, for example, less than 1 wt %, preferably less than 0.5 wt %, more preferably with less than 0.05 wt % in various solvents, reactants, and other components of the system.

In another embodiment the HFC's are used in combination with one or more gases inert to the polymerisation such as carbon dioxide, nitrogen, hydrogen, argon, neon, helium, krypton, xenon, and/or other inert gases. Preferred gases include carbon dioxide and/or nitrogen. Preferably, inert gases are in predominate liquid phase at entry to the reactor.

The HFC diluent is typically present at 1 to 100 volume % based upon the total volume of the diluents in the hydrocarbon-rubber slurry, alternatively between 5 and 100 volume %, alternatively between 10 and 100 volume %, alternatively between 15 and 100 volume %, alternatively between 20 and 100 volume %, alternatively between 25 and 100 volume %, alternatively between 30 and 100 volume %, alternatively between 35 and 100 volume %, alternatively between 40 and 100 volume %, alternatively between 45 and 100 volume %, alternatively between 50 and 100 volume %, alternatively between 55 and 100 volume %, alternatively between 60 and 100 volume %, alternatively between 65 and 100 volume %, alternatively between 70 and 100 volume %, alternatively between 75 and 100 volume %, alternatively between 80 and 100 volume %, alternatively between 85 and 100 volume %, alternatively between 90 and 100 volume %, alternatively between 95 and 100 volume %, alternatively between 97 and 100 volume %, alternatively between 98 and 100 volume %, and alternatively between 99 and 100 volume %. In a preferred embodiment the HFC diluent is selected from the group consisting of 1,1-difluoroethane, 1,1,1-trifluoroethane, and 1,1,1,2-tetrafluoroethane and mixtures thereof.

While the method of this disclosure will generally be carried out at a pressure which is at or above the pressure at which the HFC diluent separates from the HFC diluent-polymer-solvent combination, known in the art as the bubble point line, it may also be advantageously carried out at lower pressures when a relatively small vapor phase comprising the HFC diluent can be present. For separation to occur, the pressure will be at ranges where either the liquid/liquid or liquid/liquid/vapor phases are formed. As used in the specification and claims, the term "bubble point pressure" means the vapor pressure of the HFC-Polymer-solvent system at a particular temperature. The "bubble point line" may be represented by a plot of pressure vs. temperature, which is the locus of the bubble point pressures for such a system.

The amount of HFC diluent required to achieve phase separation upon combination of the hydrocarbon-rubber slurry with the hydrocarbon solvent is a function of the solvent, the type of hydrocarbon rubber polymer present (e.g., the polymer molecular weight, molecular weight distribution, the rubber composition, and the composition and purity of the HFC diluent. Accordingly, no specific value exists for all situations. However, the hydrofluorocarbon diluent is preferably present in the hydrocarbon-rubber slurry such that upon combination with a hydrocarbon solvent, the HFC diluent preferably accounts for at least 10 wt % of the total amount of materials present in the combination of the hydrocarbon-rubber slurry with the hydrocarbon solvent. In an embodiment, the HFC preferably accounts for at least 15 wt %, preferably at least 20 wt %, preferably at least 25 wt %, preferably at least 30 wt %, preferably at least 35 wt %, preferably at least 40 wt %, preferably at least 45 wt %, preferably at least 50 wt %, of the total amount of materials present in the combination of the hydrocarbon-rubber slurry with the hydrocarbon solvent.

The required amount of the HFC diluent may also be determined relative to a preferred amount of hydrocarbon solvent present as required for a given amount of hydrocarbon-rubber. In making such a determination, compositions of polymer solution (the hydrocarbon-rubber dissolved in the hydrocarbon solvent) and the HFC diluent are prepared and the temperatures and pressures at which phase separation occurs are measured. These techniques are well known in the art and readily accomplished by the experienced practitioner. For example, a small amount of HFC diluent is dissolved in a polymer solution of given composition. The solution is cooled until turbidity first appears. This temperature is the UCST for the prepared composition. The solution may then be heated until turbidity appears. This temperature is the LCST. These measurements are repeated with increasing concentrations of the HFC diluent to produce a phase diagram which indicates increasing UCST and decreasing LCST as the concentration of HFC diluent increases. At or above the critical concentration, the USCT and LCST are equal and phase separation occurs at all temperatures provided the pressure is below the critical pressure of the system.

The minimum critical concentration is obtained by plotting UCST and LCST versus HFC-diluent concentration. The point of coincidence of the UCST and LCST in such a plot defines the minimum critical concentration.

While polymer separation processes are generally considered in the context of solution and/or slurry polymerization processes, it is often necessary to affect such separations in processes other than polymerization processes. For example, butyl rubber is halogenated by first dissolving the finished polymer in hexane, halogenating the polymer and subsequently recovering the polymer. The separation process of this disclosure is equally applicable to such a separation.

Solvents

The hydrocarbon solvent may comprise $C_1$-$C_{10}$ hydrocarbons. Hydrocarbon solvents of the present disclosure are preferably selected such that the intended amount of hydrocarbon rubber present in the hydrocarbon-rubber slurry is soluble in the amount of solvent present at the temperatures at which the slurry is contacted with the solvent. Illustrative non-limiting examples of the hydrocarbon solvents which can be used in the practice of this disclosure include linear, branched or cyclic $C_5$-$C_8$ hydrocarbons. They include the isomers of pentane, hexane, heptane, octane, benzene, toluene, xylene, cyclohexane or mixtures thereof.

Specific examples of suitable hydrocarbon solvents include, but are not limited to, propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof. Ultra Low Benzene type hexane (ULB hexane), which is a preferred grade of hexane consists essentially of a mixture of $C_6$ isomers, namely n-hexane, 2-methylpentane, 3-methylpentane, methylcyclopentane, and cyclohexane. The exact balance of these isomers in ULB hexane varies from refinery to refinery.

Separation Process

In an embodiment of the present disclosure, a process for separating a hydrocarbon-rubber from a hydrofluorocarbon diluent comprises the steps of contacting a polymer slurry comprising the hydrocarbon-rubber dispersed within the hydrofluorocarbon diluent at an initial temperature with a hydrocarbon solvent capable of dissolving the hydrocarbon-rubber, to produce a first essentially homogeneous liquid phase and a second essentially homogeneous liquid phase, and separating the first essentially homogeneous liquid phase from the second essentially homogeneous liquid phase.

The hydrofluorocarbon diluent is preferably 1,1-difluoroethane (152a) or 1,1,1,2-tetrafluoroethane (134a.) The hydrocarbon solvent is preferably a $C_5$-$C_7$ alkane. The first essentially homogeneous liquid phase and the second essentially homogeneous liquid phases produced are preferably liquid solutions in that the components of each phase are dissolved in the phase to produce an essentially clear solution. The first essentially homogeneous liquid phase preferably comprises at least 20 wt %, preferably at least 30 wt %, preferably at least 40 wt %, preferably at least 50 wt %, at least 60 wt %, preferably at least 70 wt %, preferably at least 80 wt %, preferably at least 85 wt %, preferably at least 90 wt %, preferably at least 95 wt %, preferably at least 99 wt % of the hydrofluorocarbon diluent based on the total weight of the hydrofluorocarbon diluent in the polymer slurry.

The first essentially homogeneous liquid phase preferably comprises at least 60 wt %, preferably at least 70 wt %, preferably at least 80 wt %, preferably at least 85 wt %, preferably at least 90 wt %, preferably at least 95 wt %, preferably at least 99 wt % of the residual unreacted monomers (based on the total weight of the residual unreacted monomers in the polymer slurry) from which the hydrocarbon-rubber is formed.

The first essentially homogeneous liquid phase preferably comprises at least 60 wt %, preferably at least 70 wt %, preferably at least 80 wt %, preferably at least 85 wt %, preferably at least 90 wt %, preferably at least 95 wt %, preferably at least 99 wt % of the catalyst, cocatalyst, and/or activators (based on the total weight of the catalyst, cocatalyst, and/or activators in the polymer slurry) used to produce the hydrocarbon-rubber.

The first essentially homogeneous liquid phase preferably comprises less than 10 wt %, preferably less than 5 wt %, preferably less than 5 wt %, preferably less than 4 wt %, preferably less than 3 wt %, preferably less than 2 wt %, preferably less than 1 wt %, preferably less than 0.5 wt % of the hydrocarbon-rubber present (based on the total weight of the hydrocarbon-rubber present in the polymer slurry). Most preferably, the first essentially homogeneous liquid phase comprises essentially all of the diluent, essentially all of the unreacted monomers, essentially all of the catalyst, and essentially none of the hydrocarbon-rubber present in the polymer slurry.

The hydrocarbon solvent concentration in each essentially homogeneous phase may vary depending upon on the volatility of the hydrocarbon solvent, the choice of the hydrofluorocarbon as well as the objective of the desired separation. Generally, the hydrocarbon solvent will be present in each phase with the second essentially homogeneous liquid phase preferably comprising at least 30 wt % of the hydrocarbon solvent.

The second essentially homogeneous liquid phase preferably comprises at least 60 wt %, preferably at least 70 wt %, preferably at least 80 wt %, preferably at least 85 wt %, preferably at least 90 wt %, preferably at least 95 wt %, preferably at least 99 wt % of the hydrocarbon-rubber (based on the total weight of the hydrocarbon-rubber present in the polymer slurry).

The second essentially homogeneous liquid phase preferably comprises less than 80 wt %, preferably less than 70 wt %, preferably less than 60 wt %, preferably less than 50 wt %, preferably less than 40 wt %, preferably less than 30 wt %, preferably less than 20 wt %, preferably less than 15 wt %, preferably less than 10 wt %, preferably less than 5 wt. %, preferably less than 1 wt. % of the hydrofluorocarbon diluent present (based on the total weight of the hydrofluorocarbon diluent present in the polymer slurry). Most preferably, the second essentially homogeneous liquid phase comprises essentially all of the hydrocarbon-rubber present, essentially all of the hydrocarbon solvent present, and essentially none of the unreacted monomers, the catalyst, and the hydrofluorocarbon diluent present in the system.

Depending on the temperature and the pressure, a vapor phase may also be formed comprising or consisting essentially of the hydrofluorocarbon diluent.

The process of this disclosure may also include the step of removing at least a portion of the hydrocarbon solvent from the second essentially homogeneous liquid phase to produce a hydrocarbon-rubber cement, or to remove essentially all of the hydrocarbon solvent to isolate the hydrocarbon-rubber.

The process of this disclosure may further comprise a step of adjusting the temperature, the pressure, and/or the weight fraction of the diluent in the resulting mixture to introduce phase-separation of the resulting mixture to produce a first essentially homogeneous liquid phase and a second essentially homogeneous liquid phase. The temperature may be adjusted from about −100 to about 160° C.

The process of this disclosure can be carried out in either a batch or continuous manner; however, a continuous process is generally preferred for economic reasons. The preferred procedure in obtaining polymer separation by utilizing this disclosure is as follows:

1. The hydrocarbon-rubber polymer slurry in an HFC diluent is contacted with a hydrocarbon solvent to dissolve the polymer at a minimum pressure of at least the vapor pressure of the resulting solution. Agitation may be desirable to obtain rapid dissolution. Turbulence in a flowing stream can provide the necessary agitation. The polymer slurry may be contacted with the hydrocarbon solvent at a pressure high enough to maintain the system as a one phase system.
2. Phase separation is allowed to occur. Where elevated pressures are used to maintain a single phase, it is necessary to reduce the pressure in order to achieve the two phase condition. The polymer phase may then be recovered by decanting, by gravity settling, by liquid/liquid centrifugation, or other suitable means.
3. The pressure may then be reduced on the light, solvent rich phase to vaporize the HFC diluent and residual monomers contained therein. Heating or cooling of the solvent rich phase to assist in the recovery of the particular HFC diluent, unreacted monomers, catalyst, and the like may also be desirable. The recovered HFC diluent and solvent, after purification, if needed, can now be reused in step 1.

The advantages of this disclosure may be more readily appreciated with reference to the following examples.

INDUSTRIAL APPLICATIONS

In some embodiments, this disclosure relates to a hydrocarbon-rubber composition made by a method comprising at least one of the processes of this disclosure. The term "hydrocarbon-rubber composition" refers to elastomers or elastomeric compositions of polymers consistent with the ASTM D1566-06 definition.

The process of this disclosure also finds application in a process of retrofitting an existing slurry cationic polymerization plant, the retrofitting process comprising the steps of:
  a) contacting a polymer slurry from the slurry cationic polymerization plant, the polymer slurry comprises a hydrocarbon-rubber dispersed in a diluent, with a hydrocarbon solvent to dissolve the hydrocarbon-rubber at a pressure greater than or equal to the vapor pressure of the resulting mixture, the diluent comprises a hydrofluorocarbon;
  b) adjusting the temperature, the pressure, and/or the weight fraction of the hydrofluorocarbon in the resulting mixture to introduce phase-separation of the resulting mixture to produce a first essentially homogeneous liquid phase and a second essentially homogeneous liquid phase; and
  c) separating the first liquid phase from the second liquid phase by decanting, gravity settling, liquid/liquid centrifugation, or a combination thereof,
  wherein the first liquid phase comprises at least 60 wt % of the hydrofluorocarbon diluent based on the total weight of the hydrofluorocarbon diluent in the polymer slurry and wherein the second liquid phase comprises at least 90 wt % of the hydrocarbon-rubber based on the total weight of the hydrocarbon-rubber in the polymer slurry.

The process of this disclosure also finds application in a process for retrofitting an existing solution cationic polymerization plant, the retrofitting process comprising the steps of:
  a) contacting a polymer solution from the solution cationic polymerization plant, the polymer solution comprises a hydrocarbon-rubber dissolved in a solvent, with a hydrofluorocarbon at a pressure greater than or equal to the vapor pressure of the resulting mixture;
  b) adjusting the temperature, the pressure, and/or the weight fraction of the hydrofluorocarbon in the resulting mixture to introduce phase-separation of the resulting mixture to produce a first essentially homogeneous liquid phase and a second essentially homogeneous liquid phase; and
  c) separating the first liquid phase from the second liquid phase by decanting, gravity settling, liquid/liquid centrifugation, or a combination thereof, wherein the first liquid phase comprises at least 60 wt % of the hydrofluorocarbon based on the total weight of the hydrofluorocarbon in the polymer solution and wherein the second liquid phase comprises at least 90 wt % of the hydrocarbon-rubber based on the total weight of the hydrocarbon-rubber in the polymer solution.

This disclosure described herein may be used in the manufacture polymers useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of this disclosure make them ideal for rubber tire-curing bladders, high temperature service hoses, and conveyor belts for hot material handling.

The polymers exhibit high damping and have uniquely broad damping and shock absorption ranges in both temperature and frequency. They are useful in molded rubber parts and find wide applications in automobile suspension bumpers, auto exhaust hangers, and body mounts.

The polymers of the instant invention are also useful in tire sidewalls and tread compounds. In sidewalls, the polymer characteristics impart good ozone resistance, crack cut growth, and appearance. The polymers of this disclosure may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant invention.

Blends of the polymers of this disclosure with thermoplastic resins are used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers of the instant invention may also be blended with polyamides to produce other industrial applications.

The polymers of the instant invention may also be used as adhesives, caulks, sealants, and glazing compounds. They are also useful as plasticizers in rubber formulations with butyl, SBR, and natural rubber. In linear low density polyethylene (LLDPE) blends, they induce cling to stretch-wrap films. They are also widely employed in lubricants as dispersants and in potting and electrical cable filling materials.

In certain applications, the polymers of this disclosure make them also useful in chewing-gum, as well as in medical applications such as pharmaceutical stoppers, and the arts for paint rollers.

In an alternate embodiment, this invention relates to:
1. A process for separating a hydrocarbon-rubber from a polymer slurry having the hydrocarbon-rubber dispersed within a diluent, which comprises the steps of:
    (a) contacting the polymer slurry with a hydrocarbon solvent capable of dissolving the hydrocarbon-rubber, to produce a first liquid phase and a second liquid phase; and
    (b) separating the first liquid phase from the second liquid phase,
    wherein the diluent comprises a hydrofluorocarbon, the first liquid phase comprises at least 60 wt % of the hydrofluorocarbon based on the total weight of the hydrofluorocarbon in the polymer slurry, and the second liquid phase comprises at least 90 wt % of the hydrocarbon-rubber based on the total weight of the hydrocarbon-rubber in the polymer slurry.
2. The process of paragraph 1, wherein the first liquid phase is an essentially homogeneous liquid phase.
3. The process of any preceding paragraph, wherein the second liquid phase is an essentially homogeneous liquid phase.
4. The process of any preceding paragraph, further comprising a step of:
    adjusting the temperature, the pressure, and/or the weight fraction of the diluent in the resulting mixture to introduce phase-separation of the resulting mixture to produce a first essentially homogeneous liquid phase and a second essentially homogeneous liquid phase; and
5. The process of any preceding paragraph, wherein the polymer slurry additionally comprises unreacted monomer(s), catalyst, or a combination thereof.
6. The process of paragraph 5, wherein the first liquid phase comprises essentially all of the unreacted monomer(s), catalyst, or a combination thereof, originally present in the polymer slurry.
7. The process of any preceding paragraph, wherein the first liquid phase comprises less than 5 wt % of the hydrocarbon-rubber based on the total weight of the hydrocarbon-rubber in the polymer slurry.
8. The process of any preceding paragraph, wherein the second liquid phase comprises greater than 95 wt % of the hydrocarbon-rubber based on the total weight of the hydrocarbon-rubber in the polymer slurry.
9. The process of any preceding paragraph, wherein the hydrofluorocarbon is at least 20 wt % of the total combined mass of the polymer slurry and the hydrocarbon solvent.
10. The process of any preceding paragraph, wherein the diluent further comprises methyl chloride.
11. The process of any preceding paragraph, wherein the hydrocarbon-rubber comprises polymer(s) and/or co-polymer(s) of isobutylene, isoprene, para-methyl styrene, or a combination thereof.
12. The process of any preceding paragraph, wherein the polymer slurry further comprises a Lewis acid, wherein the Lewis acid comprises a metal or metalloids from Group 4, 5, 13, 14 or 15 of the Periodic Table of Elements.
13. The process of any preceding paragraph, wherein the hydrocarbon-rubber slurry is produced in a slurry cationic polymerization process for the production of $C_4$-$C_7$ isoolefin polymers.
14. The process of any preceding paragraph, wherein the hydrocarbon-rubber slurry comprises greater than or equal to about 10 vol % solids.
15. The process of any preceding paragraph, wherein the hydrocarbon-rubber slurry is at a temperature of less than or equal to about −20° C. when contacted with the hydrocarbon solvent.
16. The process of any preceding paragraph, wherein the hydrofluorocarbon is selected such that more of the hydrocarbon solvent is required to produce the first liquid phase and the second liquid phase, as compared to using methyl chloride as a diluent under the same conditions.
17. The process of any preceding paragraph, wherein the hydrofluorocarbon is a gas at 25° C. and a pressure of 101.3 kPa-a.
18. The process of any preceding paragraph, wherein the hydrofluorocarbon is represented by the formula:

$$C_xH_yF_z$$

wherein x is an integer from 1 to 10, y is greater than or equal to 1, and z is greater than or equal to 1.
19. The process of any preceding paragraph, wherein the hydrofluorocarbon is selected from the group consisting of: fluoromethane; difluoromethane; trifluoromethane; fluoroethane; 1,1-difluoroethane; 1,2-difluoroethane; 1,1, 1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

20. The process of any preceding paragraph, wherein the hydrofluorocarbon comprises 1,1-difluoroethane.

21. The process of any preceding paragraph, wherein the hydrofluorocarbon comprises 1,1,1,2-tetrafluoroethane.

22. The process of any preceding paragraph, wherein the hydrocarbon solvent comprises $C_1$-$C_{10}$ hydrocarbons.

23. The process of any preceding paragraph, wherein the hydrocarbon solvent is selected from the group consisting of:

propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof.

24. The process of any one paragraphs 2-23, wherein the temperature of adjusting step ranges from about −100 to about 160° C.

25. The process of any preceding paragraph, further comprising the steps of:

removing the hydrofluorocarbon diluent from the first liquid phase, the second liquid phase, or both; and
providing at least a portion of the removed hydrofluorocarbon diluent to a cationic polymerization process.
26. The process of any one of paragraphs 2-24, further comprising the steps of:
removing the hydrocarbon solvent from the first liquid phase, the second liquid phase, or both; and
providing least a portion of the removed hydrofluorocarbon diluent to step (a).
27. The process of any one paragraphs 2-26, wherein the separating step further comprises raising or lowering the temperature of the mixture.
28. A process for retrofitting an existing slurry cationic polymerization plant, the retrofitting process comprising the process of any preceding paragraph.
29. A process for retrofitting an existing solution cationic polymerization plant, the retrofitting process comprising the steps of:
a) contacting a polymer solution from the solution cationic polymerization plant, the polymer solution comprises a hydrocarbon-rubber dissolved in a solvent, with a hydrofluorocarbon at a pressure greater than or equal to the vapor pressure of the resulting mixture;
b) adjusting the temperature, the pressure, and/or the weight fraction of the hydrofluorocarbon in the resulting mixture to introduce phase-separation of the resulting mixture to produce a first essentially homogeneous liquid phase and a second essentially homogeneous liquid phase; and
c) separating the first liquid phase from the second liquid phase by decanting, gravity settling, liquid/liquid centrifugation, or a combination thereof,
wherein the first liquid phase comprises at least 60 wt % of the hydrofluorocarbon based on the total weight of the hydrofluorocarbon in the polymer solution and wherein the second liquid phase comprises at least 90 wt % of the hydrocarbon-rubber based on the total weight of the hydrocarbon-rubber in the polymer solution.
30. A hydrocarbon-rubber composition made by a method comprising the process of any preceding paragraph.

The following examples reflect embodiments of this disclosure and are by no means intended to be limiting of the scope of this disclosure.

EXAMPLES

In the current invention, the phase behavior of butyl rubber cements were determined on polymer solutions prepared from solvent mixtures of ULB hexane (ultra-low-benzene hexanes, obtained from ExxonMobil Chemical Co.) and comparative methyl chloride (obtained from Air Products) or 1,1-difluoroethane (152a, Technical Propellants) or 1,1,1,2-tetrafluroethane (134a, obtained from National Refrigerants or DuPont). Methyl chloride, 152a and 134a are generically referred to as the phase separating agent (PSA) or the diluent in the description for the purposes of teaching the method by which example data was collected. The experimental errors for all the experimental data collected were within ±2.5% of the experimental data.

The butyl rubber used for all experiments was a commercially available 268 grade or a 2222 grade from ExxonMobil Chemical Co. The 268 rubber was prepared for the measurements by dissolving it into hexane and filtering the resulting solution to remove insoluble additives. 0.2 wt. % of BHT was added to this solution as a stabilizer for the experiments described below. The hexane was removed by evaporation. The polymer was finally dried in a vacuum oven at 45° C. The 268 rubber so prepared was then dissolved in a sufficient amount of ULB hexane to reach the predetermined concentration for individual experiments.

Alternatively, the 2222 grade of butyl was obtained and used as a solution or cement in ULB hexane at a concentration of 23 to 29 wt %. The actual concentration was predetermined for individual experiments. The cement was used as received.

Two different types of experiments were run which differed in the equipment used, the method of sample preparation and the handling of the solutions in order to make phase behavior observations. In the first set of experiments, a known amount of 268 butyl rubber was added to a 20 ml scintillation vial. To this vial was added a volume of ULB hexane specified by the desired final composition. The rubber was completely dissolved in this solvent. The solution was transferred into a dry box and subsequently cooled to a temperature below the boiling point of the phase separating agent (or diluent). At this lower temperature, the required amount of diluent was added as a liquid. The sealed vial was sealed, warmed to room temperature and then mixed completely. The sample was equilibrated at the desired final temperature for at least 2 hours before an observation was made. For the purposes of clarity, this procedure is described in detail for one example composition.

To a 20 ml scintillation vial was added 1.50 grams of butyl rubber followed by 10.0 ml of ULB hexane. The polymer was allowed to completely dissolve before completing the next steps. The polymer solution was then transferred into the dry box and the solution subsequently cooled to −60° C. whereupon 1.30 ml of liquid 134a was added to the vial. The container was sealed and warmed to room temperature. The contents were mixed by occasionally shaking the vial over the next 2 hours. At that time, the phase behavior was determined (one or two phases). The volumes of the two phases were determined by marking the height of the two phases on the side of the vial. Once the contents of the vial were emptied, water was added to the appropriate mark and the volume of water measured by pouring it into a graduated cylinder.

Figure 2:
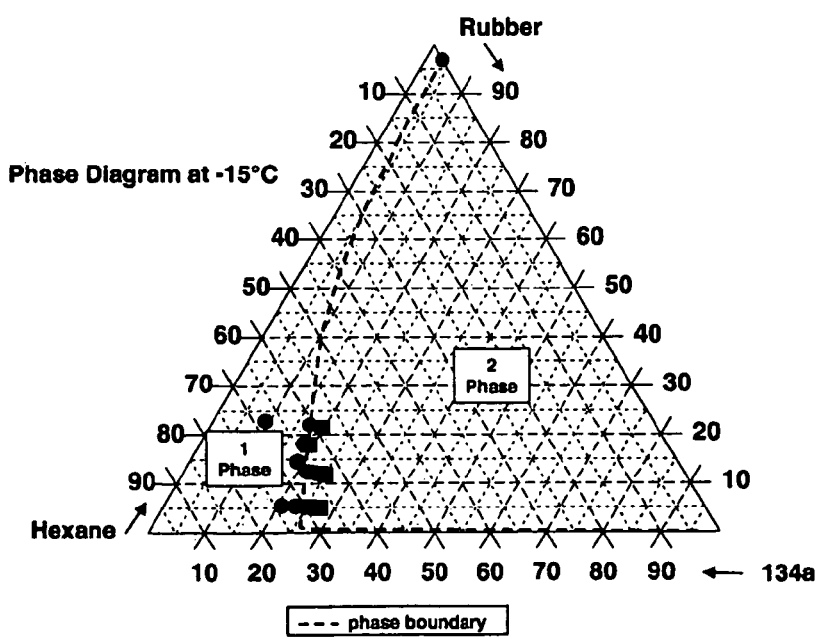
FIG. 2 shows a phase diagram of the three component system of butyl rubber, hexane and 1,1,1,2-tetrafluroethane (134a) at −15° C.

The compositions were recorded graphically on a ternary phase diagram with compositions observed to be one phase plotted as closed circles (●) and compositions observed to be two phases plotted as closed squares (■). Diagrams were constructed for measurements at 25° C. and −15° C. using 134a as the HFC diluent. These plots are shown in FIGS. 1 and 2.

Figure 3:
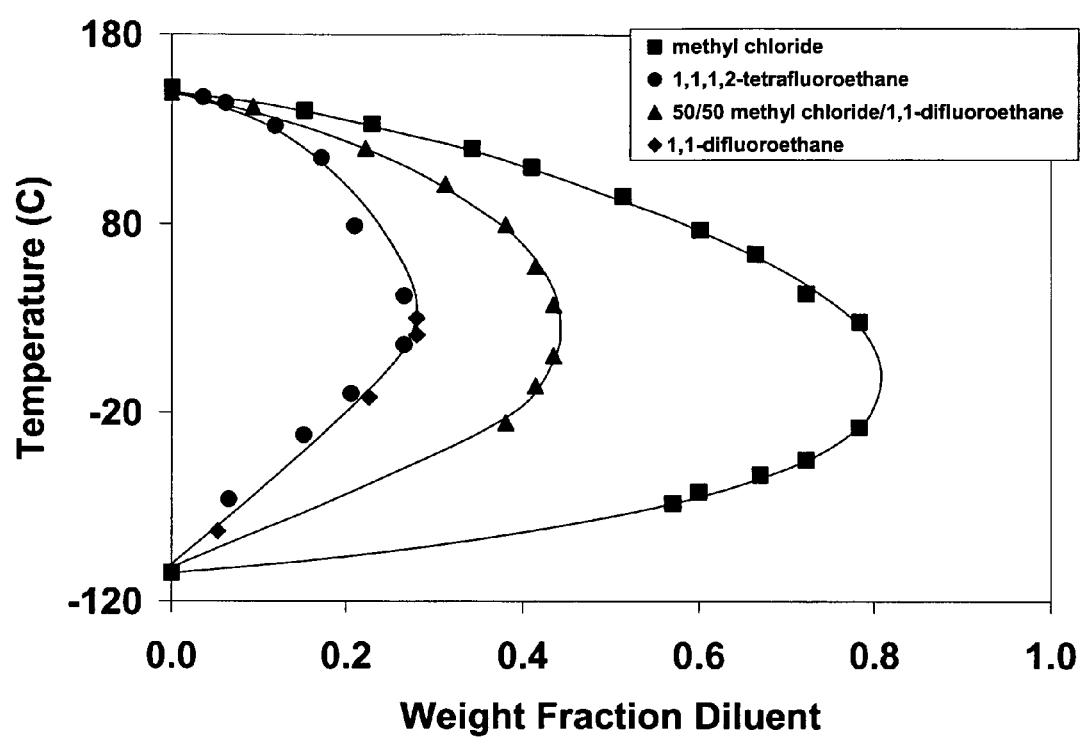
FIG. 3 shows a combined LCST and UCST phase diagram of butyl rubber dissolved in hexane using methyl chloride (MeCl), 1,1,1,2-tetrafluoroethane (134a), 1,1-difluoroethane (152a) and 1:1 blend of methyl chloride and 1,1-difluoroethane.

The second set of experiments were conducted in a 400 ml Parr vessel equipped with two opposing glass windows in the cylindrical vessel's body. In these experiments, the rubber was dissolved at room temperature into an appropriate amount of ULB hexane to prepare solution with an initial rubber concentration of 25 to 36 wt. %. The initial concentration was chosen such that the final rubber concentration in the solution would be between 16 and 24 wt. % after adding diluent for each composition in the series, consistent with commercial practices in the art. The vessel was assembled for the experiment by first loading the rubber and the ULB hexane. The vessel was sealed and the contents stirred until all the rubber was dissolved. The listed diluent was then loaded into the vessel from a sample cylinder containing the required amount of diluent under pressure at room temperature. The sample cylinder was originally loaded by adding a known amount of liquid diluent at a temperature below the boiling point of the diluent. The sample cylinder was sealed and warmed to room temperature. The mass of diluent transferred into the Parr vessel was determined by weighing the cylinder before and after the transfer. The Parr vessel was then heated with stirring until the solution turned cloudy. The LCST and the UCST were each determined by thermally equilibrating around the cloud point until the LCST (or the UCST) could be determined to within 2° C. In FIG. 3, the entire phase curve from the UCST to the LCST are determined using MeCl (CH$_3$Cl), 134a (1,1,1,2-tetrafluoroethane) and a 1:1 blend of MeCl and 152a (1,1-difluoroethane). The data are listed in Table 2.

(b) separating said first liquid phase from said second liquid phase, wherein said diluent comprises a hydrofluorocarbon, said first liquid phase comprises at least 60 wt % of said hydrofluorocarbon based on the total weight of said hydrofluorocarbon in said polymer slurry, and said second liquid phase comprises at least 90 wt % of the hydrocarbon-rubber based on the total weight of said hydrocarbon-rubber in said polymer slurry.

TABLE 2

Phase Curve Data

| MeCl Diluent | | | 134a Diluent | | | 152a | | | MeCl:152a Diluent | | |
| --- | --- | --- | --- | --- | --- | --- | --- | --- | --- | --- | --- |
| Wt % Diluent | LCST ° C. | UCST ° C. | Wt % Diluent | LCST ° C. | UCST ° C. | Wt % Diluent | LCST ° C. | UCST ° C. | Wt % Diluent | LCST ° C. | UCST ° C. |
| 0 | 152 | | 0 | 152 | | 0 | 150 | | 0 | 150 | |
| 0.15 | 140 | | 0.04 | 147 | | 0.20 | 30 | | 0.09 | 142 | |
| 0.23 | 133 | | 0.06 | 144 | | 0.28 | | 21 | 0.22 | 120 | |
| 0.34 | 120 | | 0.12 | 132 | | 0.23 | | −12 | 0.31 | 101 | |
| 0.41 | 110 | | 0.17 | 115 | | 0.05 | | −83 | 0.38 | 80 | |
| 0.51 | 95 | | 0.21 | 79 | | 0.00 | | −105 | 0.41 | 58 | |
| 0.60 | 77 | | 0.27 | 42 | | | | | 0.44 | 37 | |
| 0.66 | 64 | | 0.27 | | 16 | | | | 0.44 | | 10 |
| 0.72 | 43 | | 0.21 | | −10 | | | | 0.41 | | −6 |
| 0.78 | 28 | | 0.15 | | −32 | | | | 0.38 | | −26 |
| 0.78 | | −28 | 0.07 | | −66 | | | | 0.00 | | −105 |
| 0.72 | | −45 | 0.00 | | −105 | | | | | | |
| 0.67 | | −52 | | | | | | | | | |
| 0.60 | | −62 | | | | | | | | | |
| 0.57 | | −68 | | | | | | | | | |
| 0.00 | | −105 | | | | | | | | | |

In FIG. 3, the one phase region is to the left of the phase boundary line, and the two phase region is to the right of the phase boundary line. Accordingly, proper selection of the HFC can produce a combination wherein the amount of the HFC required to produce a two-phase system relative to comparative MeCl is greatly reduced.

All patents and patent applications, test procedures (such as ASTM methods), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

While the illustrative embodiments of this disclosure have been described with particularity, it will be understood that various other modifications will be apparent to and can be readily made by those skilled in the art without departing from the spirit and scope of this disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which this disclosure pertains.

What is claimed is:

1. A post-polymerization process for separating a hydrocarbon-rubber from a polymer slurry having said hydrocarbon-rubber dispersed within a diluent, which comprises the steps of:
   (a) contacting said polymer slurry with a hydrocarbon solvent capable of dissolving said hydrocarbon-rubber, to produce a first essentially homogeneous liquid phase and a second essentially homogeneous liquid phase; and 2. The process of claim 1, wherein said hydrofluorocarbon comprises at least one carbon atom, and at least two fluorine atoms.

3. The process of claim 1, wherein said hydrofluorocarbon comprises 1,1-difluoroethane.

4. The process of claim 1, wherein said hydrofluorocarbon comprises 1,1,1,2-tetrafluoroethane.

5. The process of claim 1, wherein said polymer slurry additionally comprises unreacted monomer(s), catalyst, or a combination thereof.

6. The process of claim 5, wherein said first liquid phase comprises essentially all of said unreacted monomer(s), catalyst, or a combination thereof, originally present in said polymer slurry.

7. The process of claim 1, wherein said first liquid phase comprises less than 5 wt % of said hydrocarbon-rubber based on the total weight of said hydrocarbon-rubber in said polymer slurry.

8. The process of claim 1, wherein said second liquid phase comprises greater than 95 wt % of said hydrocarbon-rubber based on the total weight of said hydrocarbon-rubber in said polymer slurry.

9. The process of claim 1, wherein said hydrofluorocarbon is at least 20 % of the total combined mass of said polymer slurry and said hydrocarbon solvent.

10. The process of claim 1, wherein said hydrocarbon solvent comprises a $C_5$ to $C_7$ alkane.

11. The process of claim 1, wherein said diluent further comprises methyl chloride.

12. The process of claim 1, wherein said hydrocarbon-rubber comprises polymer(s) and/or co-polymer(s) of isobutylene, isoprene, para-methyl styrene, or a combination thereof.

13. The process of claim 1, wherein said polymer slurry further comprises a Lewis acid, wherein said Lewis acid comprises a metal or metalloids from Group 4, 5, 13, 14 or 15 of the Periodic Table of Elements.

14. The process of claim 1, wherein said hydrocarbon-rubber slurry is produced in a slurry cationic polymerization process for the production of $C_4$-$C_7$ isoolefin polymers.

15. The process of claim 1, wherein said hydrocarbon-rubber slurry comprises greater than or equal to about 10 vol % solids.

16. The process of claim 1, wherein said hydrocarbon-rubber slurry is at a temperature of less than or equal to about −20° C. when contacted with said hydrocarbon solvent.

17. The process of claim 1, wherein said hydrofluorocarbon is selected such that more of said hydrocarbon solvent is required to produce said first liquid phase and said second liquid phase, as compared to using methyl chloride as a diluent under the same conditions.

18. The process of claim 1, wherein said hydrofluorocarbon is a gas at 25° C. and a pressure of 101.3 kPa-a.

19. The process of claim 1, wherein said hydrofluorocarbon is represented by the formula:

$$C_X H_Y F_Z$$

wherein x is an integer from 1 to 10, y is greater than or equal to 1, and z is greater than or equal to 1.

20. The process of claim 1, wherein said hydrofluorocarbon is selected from the group consisting of: fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4- octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2- methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1, 1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

21. The process of claim 1, wherein said hydrocarbon solvent comprises $C_1$-$C_{10}$ hydrocarbons.

22. The process of claim 1, wherein said hydrocarbon solvent comprises linear, branched, or cyclic $C_5$-$C_8$ hydrocarbons.

23. The process of claim 1, wherein said hydrocarbon solvent is selected from the group consisting of:

propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof.

24. The process of claim 1, wherein said hydrocarbon solvent comprises an ultra low benzene grade hexane, said ultra low benzene grade hexane consists essentially of a mixture of n-hexane, 2-methylpentane, 3-methylpentane, methylcyclopentane, and cyclohexane.

25. The process of claim 1, wherein said contacting step further produces a vapor phase, wherein said vapor phase comprises said diluent.

26. A post-polymerization process for separating a hydrocarbon-rubber from a polymer slurry having said hydrocarbon-rubber dispersed in a hydrofluorocarbon diluent of, comprising the steps of
   a) contacting said polymer slurry with a hydrocarbon solvent to dissolve said hydrocarbon-rubber at a pressure greater than or equal to the vapor pressure of the resulting mixture;
   b) adjusting the temperature, the pressure, and/or the weight fraction of the diluent in said resulting mixture to introduce phase-separation of said resulting mixture to produce a first essentially homogeneous liquid phase and a second essentially homogeneous liquid phase; and
   c) separating said first liquid phase from said second liquid phase by decanting, gravity settling, liquid/liquid centrifugation, or a combination thereof,
   wherein said first liquid phase comprises at least 60 wt % of said hydrofluorocarbon diluent based on the total weight of said hydrofluorocarbon diluent in said polymer slurry and wherein said second liquid phase comprises at least 90 wt % of said hydrocarbon-rubber based on the total weight of said hydrocarbon-rubber in said polymer slurry.

27. The process of claim 26, wherein said temperature of step (b) ranges from about −100 to about 160° C.

28. The process of claim 26, wherein said hydrofluorocarbon diluent is selected from the group consisting of: fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1- butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4-heptafluoro-2-butene; 1,1,1,2,4,4,4-heptafluoro-2-butene; and mixtures thereof.

29. The process of claim 26, wherein said hydrocarbon solvent comprises $C_1$-$C_{10}$ hydrocarbons.

30. The process of claim 26, wherein said hydrocarbon solvent is selected from the group consisting of:
propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof.

31. The process of claim 26, further comprising the steps of:
(d) removing said hydrofluorocarbon diluent from said first liquid phase, said second liquid phase, or both; and
(e) providing at least a portion of the removed hydrofluorocarbon diluent to a cationic polymerization process.

32. The process of claim 26, further comprising the steps of:
(d) removing said hydrocarbon solvent from said first liquid phase, said second liquid phase, or both; and
(e) providing least a portion of the removed hydrofluorocarbon diluent to step (a).

33. The process of claim 26, wherein said separating step further comprises raising or lowering the temperature of said mixture.

34. A post-polymerization process for separating a hydrocarbon-rubber from a polymer slurry having said hydrocarbon-rubber dispersed within a diluent, which comprises the steps of:
(a) contacting said polymer slurry with a hydrocarbon solvent capable of dissolving said hydrocarbon-rubber, to produce a first liquid phase and a second liquid phase; and
(b) separating said first liquid phase from said second liquid phase,
wherein said diluent comprises a hydrofluorocarbon, said first liquid phase comprises at least 60 wt % of said hydrofluorocarbon based on the total weight of said hydrofluorocarbon in said polymer slurry, and said second liquid phase comprises at least 90 wt % of the hydrocarbon-rubber based on the total weight of said hydrocarbon-rubber in said polymer slurry.

35. The process of claim 34, wherein said hydrofluorocarbon comprises 1,1-difluoroethane.

36. The process of claim 34, wherein said hydrofluorocarbon comprises 1,1,1,2-tetrafluoroethane.

37. The process of claim 34, wherein said polymer slurry additionally comprises unreacted monomer(s), catalyst, or a combination thereof.

38. The process of claim 37, wherein said first liquid phase comprises essentially all of said unreacted monomer(s), catalyst, or a combination thereof, originally present in said polymer slurry.

39. The process of claim 34, wherein said first liquid phase comprises less than 5 wt % of said hydrocarbon-rubber based on the total weight of said hydrocarbon-rubber in said polymer slurry.

40. The process of claim 34, wherein said second liquid phase comprises greater than 95 % of said hydrocarbon-rubber based on the total weight of said hydrocarbon-rubber in said polymer slurry.

41. The process of claim 34, wherein said hydrofluorocarbon is at least 20 wt % of the total combined mass of said polymer slurry and said hydrocarbon solvent.

42. The process of claim 34, wherein said hydrocarbon solvent comprises a $C_5$ to $C_7$ alkane.

43. The process of claim 34, wherein said diluent further comprises methyl chloride.

44. The process of claim 34, wherein said hydrocarbon-rubber comprises polymer(s) and/or co-polymer(s) of isobutylene, isoprene, para-methyl styrene, or a combination thereof.

45. The process of claim 34, wherein said polymer slurry further comprises a Lewis acid, wherein said Lewis acid comprises a metal or metalloids from Group 4, 5, 13, 14 or 15 of the Periodic Table of Elements.

46. The process of claim 34, wherein said hydrocarbon-rubber slurry is produced in a slurry cationic polymerization process for the production of $C_4$-$C_7$ isoolefin polymers.

47. The process of claim 34, wherein said hydrocarbon-rubber slurry comprises greater than or equal to about 10 vol % solids.

48. The process of claim 34, wherein said hydrocarbon-rubber slurry is at a temperature of less than or equal to about −20° C. when contacted with said hydrocarbon solvent.

49. The process of claim 34, wherein said hydrofluorocarbon is selected such that more of said hydrocarbon solvent is required to produce said first liquid phase and said second liquid phase, as compared to using methyl chloride as a diluent under the same conditions.

50. The process of claim 34, wherein said hydrofluorocarbon is a gas at 25° C. and a pressure of 101.3 kPa-a.

51. The process of claim 34, wherein said hydrofluorocarbon is represented by the formula:

$$C_xH_yF_z$$

wherein x is an integer from 1 to 10, y is greater than or equal to 1, and z is greater than or equal to 1.

52. The process of claim 34, wherein said hydrofluorocarbon is selected from the group consisting of: fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1-trifluoro-2-methylpropane; 1,1,3-trifluoro-2-methylpropane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; 1,1,2-trifluoroethene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

53. The process of claim 34, wherein said hydrocarbon solvent comprises $C_1$-$C_{10}$ hydrocarbons.

54. The process of claim 34, wherein said hydrocarbon solvent comprises linear, branched, or cyclic $C_5$-$C_8$ hydrocarbons.

55. The process of claim 34, wherein said hydrocarbon solvent is selected from the group consisting of:
propane, isobutane, pentane, hexane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and combinations thereof.

56. The process of claim 34, wherein said hydrocarbon solvent comprises an ultra low benzene grade hexane, said ultra low benzene grade hexane consists essentially of a mixture of n-hexane, 2-methylpentane, 3-methylpentane, methylcyclopentane, and cyclohexane.

57. The process of claim 34, wherein said contacting step further produces a vapor phase, wherein said vapor phase comprises said diluent.

* * * * *

UNITED STATES PATENT AND TRADEMARK OFFICE
CERTIFICATE OF CORRECTION

PATENT NO. : 7,629,397 B2  
APPLICATION NO. : 11/474214  
DATED : December 8, 2009  
INVENTOR(S) : McDonald et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Second Day of November, 2010

David J. Kappos  
*Director of the United States Patent and Trademark Office*